US008220640B2

(12) United States Patent
Schmitz et al.

(10) Patent No.: US 8,220,640 B2
(45) Date of Patent: Jul. 17, 2012

(54) STACK-DISK FILTER CARTRIDGE

(75) Inventors: Kelly H. Schmitz, Cottage Grove, WI (US); Gerard Malgorn, Quimper (FR)

(73) Assignee: Cummins Filtration IP, Inc., Minneapolis, MN (US)

( * ) Notice: Subject to any disclaimer, the term of this patent is extended or adjusted under 35 U.S.C. 154(b) by 551 days.

(21) Appl. No.: 11/880,603

(22) Filed: Jul. 23, 2007

(65) Prior Publication Data

US 2009/0026124 A1    Jan. 29, 2009

(51) Int. Cl.
*B01D 25/00*     (2006.01)
*B01D 25/164*   (2006.01)

(52) U.S. Cl. .................. 210/352; 210/492; 210/231

(58) Field of Classification Search ............ 210/492, 210/352, 231
See application file for complete search history.

(56) References Cited

U.S. PATENT DOCUMENTS

| | | | | |
|---|---|---|---|---|
| 1,906,391 A | * | 5/1933 | McKinley | 210/411 |
| 2,032,828 A | * | 3/1936 | Attwood | 210/301 |
| 2,306,823 A | * | 12/1942 | Meldrum | 123/196 A |
| 2,354,380 A | * | 7/1944 | Kasten | 210/488 |
| 2,495,095 A | * | 1/1950 | Ewbank | 210/492 |
| 2,501,582 A | * | 3/1950 | Rohland | 210/492 |
| 2,548,584 A | * | 4/1951 | Briggs | 210/457 |
| 2,553,820 A | * | 5/1951 | Gunn | 210/492 |
| 2,575,995 A | * | 11/1951 | Briggs et. al. | 210/434 |
| 2,582,272 A | * | 1/1952 | Pamp, Jr. | 210/492 |
| 2,604,994 A | * | 7/1952 | Vocelka | 210/492 |
| 2,665,810 A | * | 1/1954 | Whipple | 210/131 |
| 2,682,953 A | * | 7/1954 | Gunn | 210/492 |
| 2,687,805 A | * | 8/1954 | Proulx | 210/492 |
| 2,755,937 A | * | 7/1956 | Gunn | 210/492 |
| 2,850,169 A | * | 9/1958 | Briggs | 210/492 |
| 2,856,076 A | * | 10/1958 | Whipple | 210/352 |
| 3,370,712 A | | 2/1968 | Smith et al. | |
| 3,481,472 A | * | 12/1969 | Petri | 210/232 |
| 3,578,176 A | * | 5/1971 | Cuyler | 210/492 |
| 3,618,783 A | * | 11/1971 | Cuyler | 210/492 |
| 3,647,084 A | * | 3/1972 | Martin | 210/492 |
| 4,334,994 A | * | 6/1982 | Jensen | 210/336 |
| 4,410,430 A | | 10/1983 | Hagler, Jr. | |

(Continued)

FOREIGN PATENT DOCUMENTS

FR          940644 A       12/1948

(Continued)

OTHER PUBLICATIONS

Robert E. Joerres, Chapter 6 entitled "Springs"—from "Standard Handbook of Machine Design," Third edition, ed. Joseph E. Shigley et al., pub. McGraw-Hill, New York, 2004.*

(Continued)

*Primary Examiner* — Nam Nguyen
*Assistant Examiner* — Denise R Anderson
(74) *Attorney, Agent, or Firm* — Hamre, Schumann, Mueller & Larson, P.C.

(57) ABSTRACT

One embodiment is a replaceable filter cartridge including a plurality of stacked disks of filter media extending between a first endplate and a second endplate. A plurality of frame members extend axially between and connect the first endplate to the second endplate. The cartridge includes a compression assembly supported by the first endplate. The compression assembly includes at least one compression member operable to impart a compression force on said plurality of stacked disks of filter media thereby biasing said plurality of stacked disks of filter media in an axial direction toward the second endplate.

22 Claims, 9 Drawing Sheets

U.S. PATENT DOCUMENTS

| | | | |
|---|---|---|---|
| 4,632,755 A | | 12/1986 | DeGraffenried |
| 4,968,425 A | * | 11/1990 | Nakajima et al. .............. 210/488 |
| 5,217,606 A | * | 6/1993 | Ramponi et al. .............. 210/136 |
| 5,435,915 A | * | 7/1995 | Connors, Jr. .................. 210/232 |
| 5,447,627 A | * | 9/1995 | Loafman et al. .............. 210/316 |
| 5,500,122 A | * | 3/1996 | Schwartz ................. 210/321.75 |
| 5,520,807 A | * | 5/1996 | Myrna et al. ............. 210/321.75 |
| 5,665,231 A | * | 9/1997 | Langsdorf et al. ............ 210/314 |
| 5,858,231 A | | 1/1999 | Drori |
| 6,345,721 B1 | | 2/2002 | Durre et al. |
| 6,511,101 B1 | * | 1/2003 | Sommer et al. ............... 285/319 |
| 6,540,913 B1 | * | 4/2003 | Guichaoua et al. ........... 210/232 |
| 6,635,175 B2 | | 10/2003 | Stankowski |
| 6,669,844 B2 | * | 12/2003 | Strohm et al. ................ 210/224 |
| 2001/0037969 A1 | * | 11/2001 | Stankowski .................. 210/348 |
| 2003/0196947 A1 | | 10/2003 | Gundrum et al. |
| 2007/0095744 A1 | | 5/2007 | Bagci et al. |

FOREIGN PATENT DOCUMENTS

| | | |
|---|---|---|
| FR | 973788 A | 2/1951 |
| WO | WO 97/16232 A1 | 5/1997 |
| WO | WO 03/082434 A1 | 10/2003 |
| WO | WO 2006/093981 A2 | 9/2006 |
| WO | WO 2006/094065 A2 | 9/2006 |

OTHER PUBLICATIONS

European Search Report of European Application No. 08 25 2442, dated Mar. 27, 2009.

* cited by examiner

STACK-DISK FILTER CARTRIDGE

BACKGROUND

The present invention relates generally to a filter unit and/or filter housing that can be used, for example, with internal combustion engines, such as diesel or gasoline powered engines. Such filter units are utilized since various fluids, including lubricating fluids and fuel, used in vehicle engines are susceptible to being contaminated by water, sand, dirt and other particulate materials.

Replaceable filter cartridges and assemblies have proven to be useful components of filtration systems for a variety of applications including, for example, internal combustion engines such as diesel engines. Replaceable filter elements can be coupled with other components of filtration systems to provide assemblies operable to remove particulates and other undesirable matter from fluids. Present approaches to replaceable filter cartridges and other components of filtration systems suffer from a variety of drawbacks, limitations, disadvantages and problems including those respecting sealing adequacy, part count, complexity, serviceability, cost, durability, thermal matching and others. There is a need for unique and inventive replaceable filter cartridges and assemblies.

SUMMARY

In one embodiment of the present invention there is a replaceable filter cartridge including a plurality of stacked disks of filter media extending between a first endplate and a second endplate. The cartridge has a plurality of frame members extending axially between and connected to the first endplate and the second endplate. The cartridge further has a compression assembly supported by the first endplate. The compression assembly includes at least one compression member operable to impart a compression force on said plurality of stacked disks of filter media thereby biasing said plurality of stacked disks of filter media in an axial direction toward the second endplate.

In one refinement of the embodiment of the invention the cartridge includes at least two frame members.

In another refinement of the embodiment of the invention the frame members include three members that are equally spaced around the perimeter of said plurality of stacked disks of filter media.

In another refinement of the embodiment of the invention the first endplate includes a receiving channel operable to receive said at least one compression member.

In another refinement of the embodiment of the invention the at least one compression member is a metal spring.

In another refinement of the embodiment of the invention the at least one compression member is a composite spring, and the replaceable filter cartridge is incinerable.

In another refinement of the embodiment of the invention the frame members comprise a first pair of legs integrally formed with the first endplate and a second pair of legs integrally formed with the second endplate. The first pair of the legs are connected to the second pair of legs at a position between the first endplate and the second endplate.

In another refinement of the embodiment of the invention the at least one compression member is a composite spring.

In another refinement of the embodiment of the invention the replaceable filter cartridge is incinerable. The frame members are molded as part of at least one of the first endplate and the second endplate In another refinement of the embodiment of the invention the compression assembly includes a compression endplate engaging the plurality of stacked disks of filter media. The compression endplate is spaced apart from the first endplate by at least one compression member. The compression endplate is operable to transfer the compression force from the at least one compression member onto the plurality of stacked disks of filter media.

In another refinement of the embodiment of the invention at least one of the first endplate and the compression endplate includes a substantially cylindrical flange extending toward the other of the first endplate and the compression endplate. The compression member being a spring around the flange.

In another refinement of the embodiment of the invention the compression assembly includes a plurality of compression members. The plurality of compression members extend toward and contact the first endplate biasing the plurality of stacked disks in the axial direction toward the second endplate.

In another refinement of the embodiment of the invention the compression assembly further includes a compression endplate. The compression endplate is integrally formed with at least one compression member.

In another embodiment of the present invention there is a replaceable filter cartridge comprising a plurality of stacked disks of filter media extending between a first end and a second end. The first endplate is positioned adjacent to the first end. The plurality of frame members is connected to the first endplate. The plurality of frame members and the endplate cooperate with each other to retain the plurality of stacked disks of filter media. The means are positioned adjacent to the second end of the plurality of stacked disks of filter media. The means are connected to the plurality of frame members for axially biasing the plurality of stacked disks of filter media toward the first end.

In a refinement of the embodiment of the invention the replaceable filter cartridge is incinerable. The frame members are molded as part of at least one of the first endplate and the second endplate.

In another refinement of the embodiment of the invention the means for axially biasing includes a second endplate and a compression assembly including at least one compression member operable to impart a compression force on said plurality of stacked disks of filter media thereby axially biasing said plurality of stacked disks of filter media toward the first end. The plurality of frame members are also connected to the second endplate.

In another refinement of the embodiment of the invention the compression assembly includes a compression endplate engaging the plurality of stacked disks of filter media. The compression endplate is spaced apart from the second endplate by at least one compression member. The compression endplate is operable to transfer the compression force from at least one compression member onto the plurality of stacked disks of filter media.

In another refinement of the embodiment of the invention at least one of the second endplate and the compression endplate includes a substantially cylindrical flange extending toward the other of the first endplate and the compression endplate. The compression member being a spring around the flange.

In another refinement of the embodiment of the invention the compression assembly includes a plurality of compression members. Each compression member is a flange attached to the compression endplate. The flanges extend toward the second endplate.

In another refinement of the embodiment of the invention the second endplate includes a receiving channel operable to receive at least one compression member.

In another refinement of the embodiment of the invention the means for axially biasing includes a spring endcap having an upper surface and a lower surface having a recess. The upper surface is operable to support the plurality of stacked disks of filter media.

In another refinement of the embodiment of the invention the upper surface is operable to flex into and out of the recess thereby axially biasing the plurality of stacked disks of filter media toward the first endplate.

In another embodiment of the present invention there is an incinerable filter cartridge comprising a plurality of stacked disks of filter media extending between a first end and a second end. The first endcap is positioned adjacent to the first end. The second endcap is positioned adjacent to the second end, and the second endcap is integrally formed with at least one compression member. The cartridge has a plurality of frame members connected to the first endcap, and the second endcap. The second endcap is a spring endcap operable to impart a compression force on the plurality of compressible disks of filter media thereby biasing the plurality of stacked disks of filter media in an axial direction toward the first end.

In a refinement of the embodiment of the invention the plurality of frame members includes at least two frame members equally spaced around the perimeter of the plurality of stacked disks of filter media.

In another refinement of the embodiment of the invention the second endcap includes an upper surface and a lower surface having a recess. The upper surface is operable to support said plurality of stacked disks of filter media.

In another refinement of the embodiment of the invention the frame members comprise a first pair of legs integrally formed with the first endcap and a second pair of legs integrally formed with the second endcap. The first pair of the legs are connected to the second pair of legs at a position between the first endcap and the second endcap.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would occur to one skilled in the art to which the invention relates.

Figure 1:
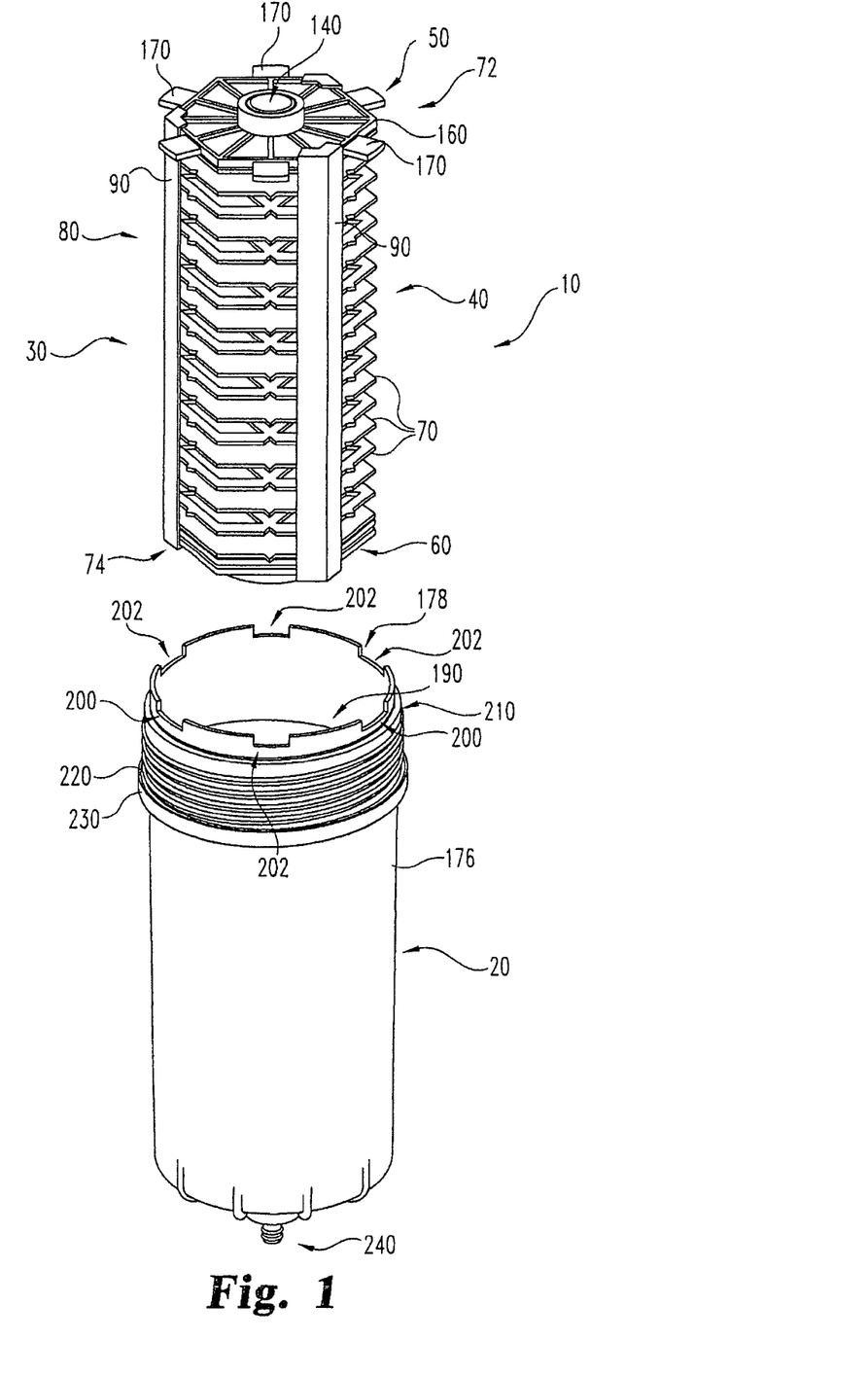
FIG. 1 is a partially exploded perspective view of a filter assembly.
Figure 2:
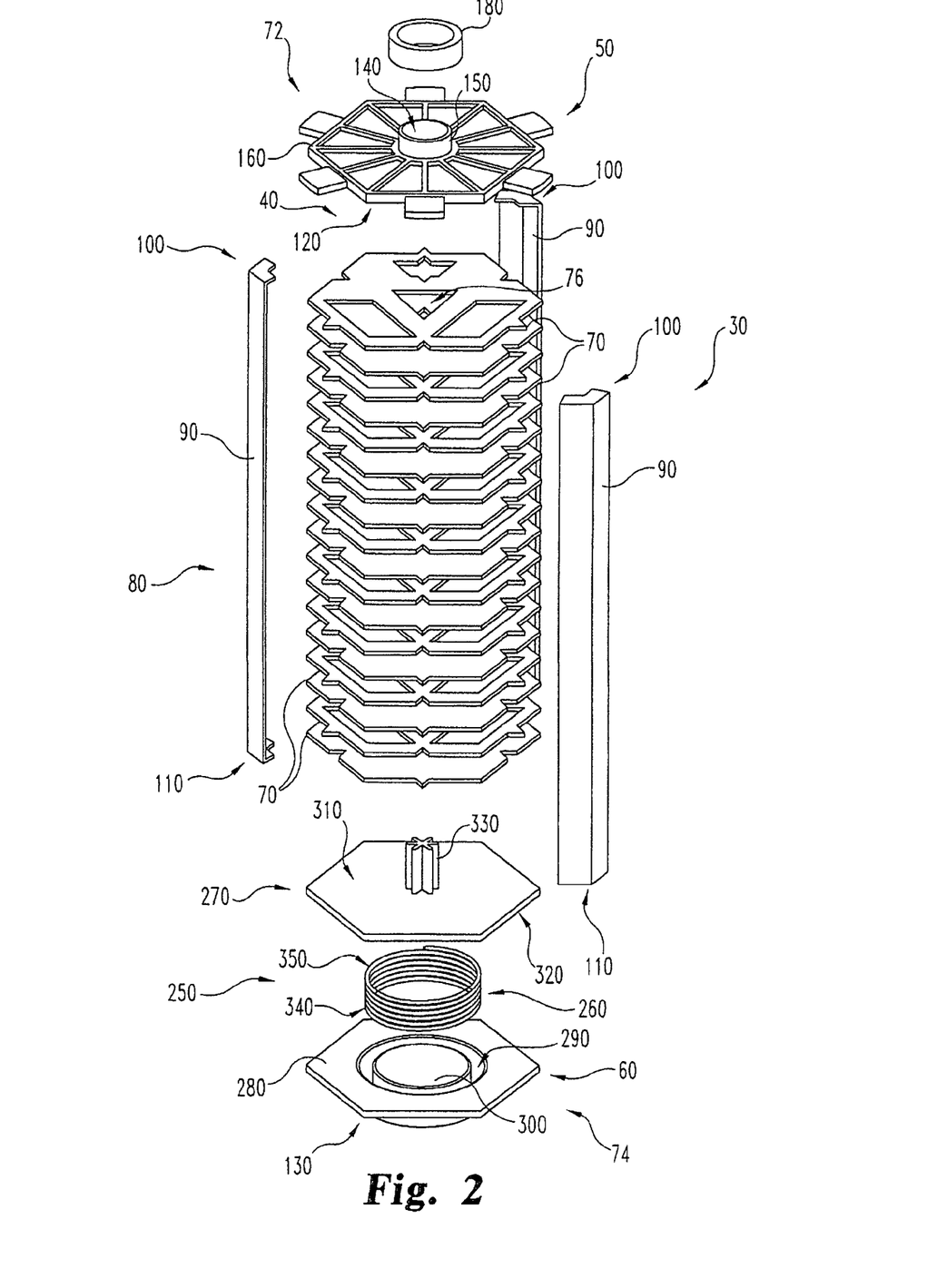
FIG. 2 is an exploded perspective view of a replaceable filter cartridge.

With reference to FIG. 1 there is illustrated a partially exploded perspective view of a filter assembly 10 including a shell 20 that is configured to couple to a filter head (not shown) that may include a head insert (not shown) and a replaceable filter cartridge 30. Replaceable filter cartridge 30 is a self-contained cartridge that includes filter media 40 positioned between a top endplate 50 and a bottom endplate 60. Endplates 50, 60 are each preferably a unitary structure formed of a composite material such as thermoplastic or a thermoset. Other embodiments contemplate that top endplate 50, bottom endplate 60 or both endplates 50, 60 could be formed of multiple pieces coupled together. As shown in FIG. 2, filter media 40 is a stack-disk bypass filter medium that includes a plurality of stacked disks 70 of filter media extending between a top end 72 and a bottom end 74. Each disk in the plurality of stacked disks 70 includes an opening 76. The opening 76 of the top end 72 of the plurality of stacked disks 70 is preferably aligned with an orifice or opening 140 defined by top endplate 50. When the filter cartridge is assembled top end 72 is preferably substantially adjacent to top endplate 50.

As shown in FIGS. 1 and 2, top endplate 50 is connected to bottom endplate 60 by a frame assembly 80. Frame assembly 80 includes a plurality of axially extending frame members 90 that extend along the axial length of filter media 40. In one form, frame members 90 are rigid and are formed from a composite. Other embodiments contemplate frame members 90 being formed from materials other than a composite, such as metal. Each frame member 90 includes a top engaging portion 100 and a bottom engaging portion 110. Each top engaging portion 100 preferably couples to a corner portion 120 of top endplate 50. Each bottom engaging portion 110 preferably couples to a corner portion 130 of bottom endplate 60. Preferably, the plurality of frame members 90 are equally spaced around the perimeter of each endplate 50, 60. While only three frame members 90 are shown in the figures, different numbers of frame members 90 might be utilized. In particular, in one embodiment contemplated as within the scope of the invention only two frame members join the endplates.

Top endplate 50 includes opening 140 preferably fluidly connected to a central column flow path for filtered fluid defined by centrally positioned opening 76 in the plurality of stacked disks 70 of filter media. As shown in FIG. 2, a sealing flange 150 is positioned adjacent opening 140 and extends from top endplate 50 in a generally axial direction. Top endplate 50 extends from opening 140 to an outer periphery 160. Top endplate 50 preferably includes a plurality of projections or legs 170 extending from periphery 160. Projections 170 extend in a radial direction away from opening 140. In one form of the present invention, a gasket 180 is provided to surround sealing flange 150 to provide additional sealing when filter assembly 10 is mounted to the filter head.

As shown in FIG. 1, shell 20 includes a body wall 176 extending from an open end 178 that defines a hollow interior 190 into which replaceable filter cartridge 30 is inserted. Preferably, shell 20 includes six spaced recesses, notches or slots 200 and 202 near open end 178. In one embodiment, there are two slots 200 that are constructed and arranged with a first shape and four slots 202 that are constructed and arranged with a second shape that is slightly different from the first shape. In one form, these six slots 200 and 202 are equally spaced around upper edge 38. For this arrangement of six (6) slots, the replaceable filter cartridge 30 can be installed in any one of six orientations in terms of its rotation relative to shell 20. In another form, the spacing between the series of six (6) slots 200 and 202 is not equal, but random or varied, such that there is only a single orientation for replaceable filter cartridge 30 to insert into the shell 20. Going to a varied spacing for the six slots requires a corresponding varied spacing for the projections 170 of top endplate 50. In addition to slots 200 and 202, shell 20 further includes external threads 210 that mate with the filter head, a sealing ring 220, and an abutment flange 230. In one form of the present application, shell 20 further includes a water drainage valve 240 located at the bottom of shell 20. When installed in shell 20, replaceable filter cartridge 30 is supported closer to open end 178.

Seating of replaceable filter cartridge 30 into shell 20 is achieved by the use of slots 200 and 202 and cooperating outwardly-extending radial projections 170. Preferably, there are six projections 170 that are constructed and arranged to match the spacing of the slots 200 and 202. While there are two styles of slots 200 and 202 as described and as will be explained in greater detail, all six projections 170 are constructed and arranged with the same size and shape. The two slots 200 are constructed and arranged for a secure capture of the inserted projection 170 by an interference fit. The other four slots 202 are each constructed and arranged for a close clearance receiving fit of their corresponding projection 170. These other four slots 202 provide support for the replaceable filter cartridge 30. All six slots 200, 202 cooperate with their receiving projections 170 in order to set the desired insertion depth of the replaceable filter cartridge 30 into shell 20. The fit between the projections 170 and slots 200, 202 also prevents any rotation of the replaceable filter cartridge 30 relative to shell 20, once the fluid filter cartridge is properly installed. Further details regarding projections 170 and slots 200, 202 may be found in U.S. patent application Ser. No. 11/264,473, filed Nov. 1, 2005, assigned to the assignee of the present application, entitled "Fluid Filter with Open-End Flow, Replaceable Cartridge," and published on May 3, 2007 as U.S. Patent Publication No. 2007/0095744, the disclosure of which is incorporated by reference herein in its entirety.

As shown in FIG. 2, replaceable filter cartridge 30 includes one embodiment of a compression assembly 250 supported by bottom endplate 60. In one embodiment, compression assembly 250 includes at least one compression member 260, and a compression endplate 270. Bottom endplate 60 includes a top surface 280 having a receiving channel such as a groove 290 operable to receive compression member 260. Top surface 280 and receiving channel 290 cooperate to form a support portion 300 that is sized to receive at least part of compression member 260. Compression endplate 270 includes an upper surface 310, a lower surface 320, and a preferably star shaped boss portion 330 extending upward from the upper surface 310. Boss portion 330 is sized to be positioned within center opening 76 at the bottom end 74 of at least one stacked disk 70. Boss portion 330 minimizes or prevents unfiltered fluid from flowing through the internal columnar fluid flow path of filter media 40. Compression member 260 includes a bottom end 340 and a top end 350. Bottom end 340 interfaces with bottom endplate 60 and top end 350 interfaces with lower surface 320 such that compression member 260 imparts a compression force on the plurality of stacked disks of filter media 70. The compression force maintains compression on the plurality of stacked disks of filter media 70. The compression force biases the plurality of stacked disks 70 toward top endplate 50. Preferably, compression member 260 is formed from a composite material such as thermoplastic and all components of replaceable cartridge filter 30 are incinerable. In other forms of the present application, compression member 260 is a metal coil spring and not incinerable.

Figure 3:
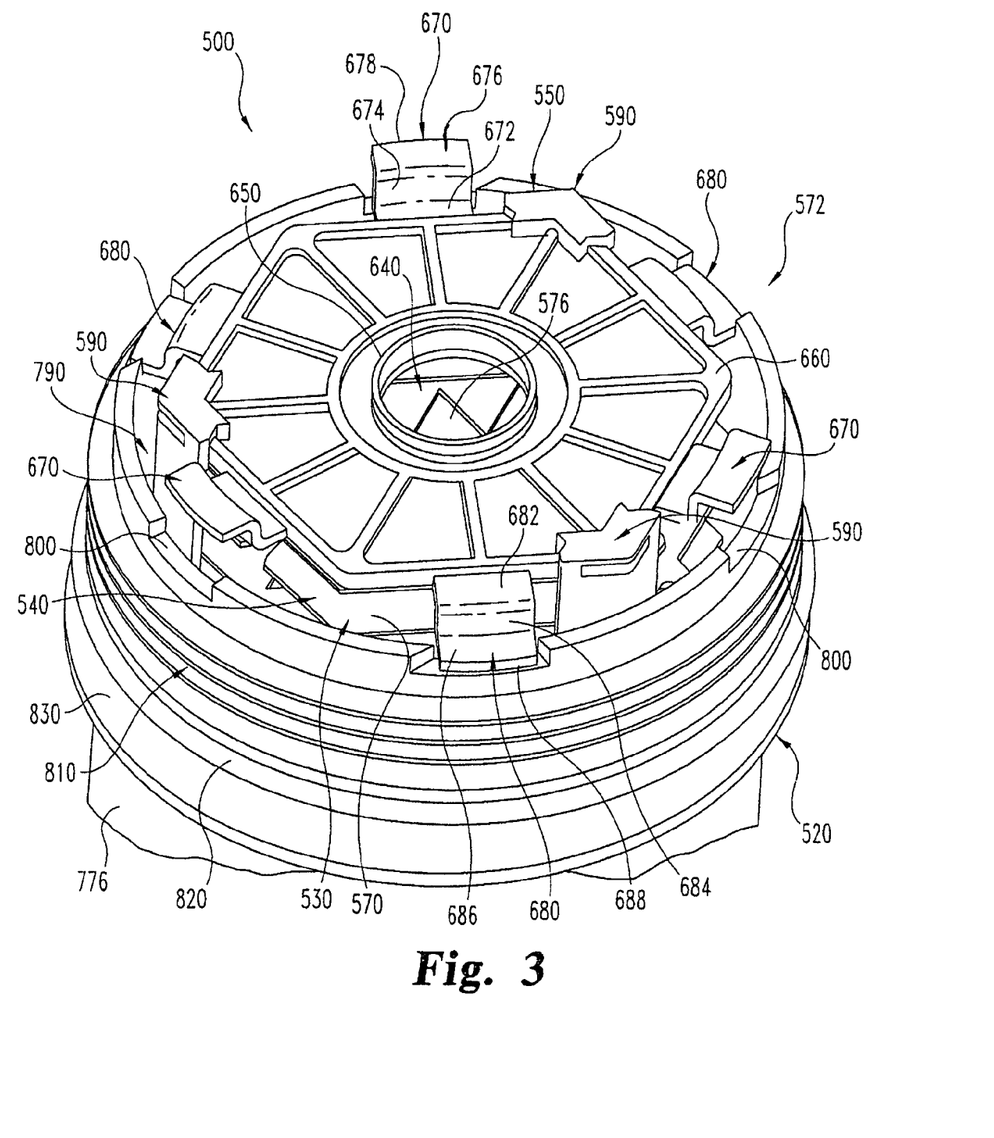
FIG. 3 is a perspective view of a portion of a filter assembly.

With reference to FIG. 3 there is illustrated a perspective view of a portion of a filter assembly 500. Filter assembly 500 includes a replaceable filter cartridge 530 and a shell 520 that is configured to couple to a filter head (not shown) that may include a head insert (not shown). Replaceable filter cartridge 530 is a self-contained bypass cartridge that includes filter media 540 positioned between a top endplate 550 and a bottom endplate (not shown). Filter media 540 is a stack-disk bypass filter medium that includes a plurality of stacked disks 570 of filter media extending between a top end 572 and a bottom end (not shown). Each disk in the plurality of stacked disks 570 includes an opening 576. The opening 576 of the top end 572 of the plurality of stacked disks 570 is preferably aligned with an orifice or opening 640 defined by top endplate 550. When the filter cartridge is assembled, top end 572 is preferably substantially adjacent to top endplate 550. Replaceable filter cartridge 530 also preferably includes three (3) equally spaced axially extending frame members 590 that extend along the axial length of replaceable filter cartridge 530. While only three frame members 590 are shown in FIG. 3, different numbers of frame members 590 might be utilized. As previously noted, in one embodiment contemplated as within the scope of the invention only two frame members join the endplates.

Bottom endplate and top endplate 550 are each preferably a unitary structure formed of a composite material such as thermoplastic. Other embodiments contemplate that endplate 550 could be formed of multiple pieces coupled together. Endplate 550 includes an opening 640 preferably aligned with the central column of openings in filter media 540. A sealing flange 650 is positioned adjacent opening 640 and extends from endplate 550 in a generally axial direction. Endplate 550 extends from opening 640 to an outer periphery 660.

Endplate 550 also includes a first plurality of legs or projections 670 that extends from periphery 660 and a second plurality of legs or projections 680 that extend from periphery 660. Preferably, each leg 670 includes a first portion 672 that extends from periphery 660 in a radial direction to a bend 674 that bends in an axial direction away from filter media 540, and a second portion 676 that extends from bend 674 at a radially outward direction to a leg extremity 678. Preferably, each leg 680 includes a first portion 682 that extends from periphery 660 in a radial direction to a bend 684 that bends in an axial direction toward filter media 540, and a second portion 686 that extends from bend 674 at a radially outward direction to a leg extremity 688. A number of additional embodiments contemplate different shapes, sizes, numbers, and configurations for legs 670 and 680. For example, legs 670 and/or legs 680 could extend from periphery 660 at angles directed inward or outward relative to the angle of the illustrated embodiment. In another example, legs 670 and/or legs 680 extend from their respective bends in directions more upward or more downward relative to the direction of the illustrated embodiment. In a further example, the angle formed by the portions extending to and from the bends could be greater or lesser than that of the illustrated embodiment. In an additional example, one or more portions of legs 670 and/or legs 680 could have greater or lesser lengths, widths, thicknesses or other dimensions than those of the illustrated embodiment. In a further example, the curvature of one or more bends could be greater than or lesser than the illustrated embodiment.

As shown in FIG. 3, shell 520 includes a body wall 776 that defines a hollow interior 790 into which replaceable filter cartridge 530 is inserted. Preferably, shell 520 includes recesses or slots 800 that receive legs 670, 680 of endplate 550, external threads 810 that mate with the filter head, sealing ring 820, and abutment flange 830. In one form of the present application, shell 20 further includes a water drainage valve (not shown in FIG. 3) located at the bottom of shell 20. When replaceable filter cartridge 530 is inserted into shell 520, legs 670, 680 are received in the recesses 800 formed in shell 520 thereby supporting the replaceable filter cartridge 530 within hollow interior 790.

Figure 4:
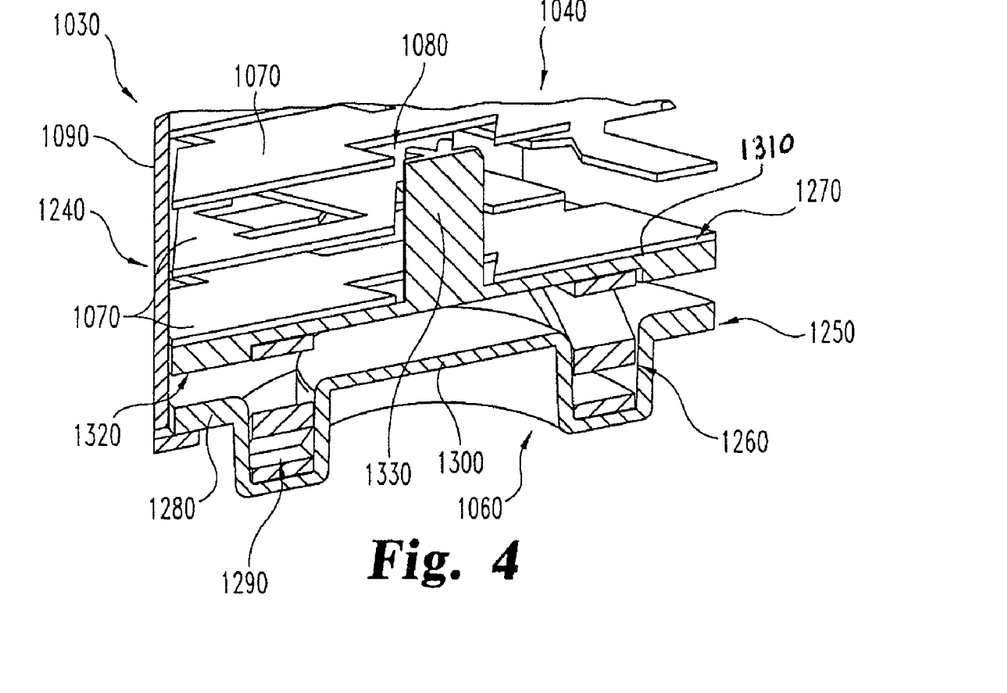
FIG. 4 is a sectional view of a portion of a replaceable filter cartridge.

With reference to FIG. 4, there is illustrated a sectional view of a portion of a replaceable filter cartridge 1030. Replaceable filter cartridge 1030 is similar to replaceable filter cartridge 30 described above and includes filter media 1040 positioned between a top endplate (not shown) and a bottom endplate 1060. The top endplate and bottom endplate 1060 are coupled together with a plurality of frame members 1090 (only one shown in FIG. 4). In the illustrated embodiment, filter media 1040 is a stack-disk bypass filter cartridge that includes a plurality of stack disks 1070 of filter media each having a central opening 1080 and are positioned in a stacked relationship to each other. Replaceable filter cartridge 1030 includes a lower portion 1240 that includes bottom endplate 1060 and a compression assembly 1250. Compression assembly 1250 includes a compression member 1260 and a compression endplate 1270. Bottom endplate 1060 includes a body 1280 having a receiving channel such as a groove 1290 to receive compression member 1260. Body 1280 and receiving channel 1290 cooperate to form a support portion 1300 that is sized to receive compression member 1260. Compression endplate 1270 includes an upper surface 1310, a lower surface 1320, and a preferably star shaped boss portion 1330 extending upward from the upper surface 1310. Boss portion 1330 is sized to be positioned within center opening 1080 of at least one stack disk 1070. Boss portion 1330 is operable to prevent unfiltered fluid from flowing through the fluid flow path defined by center openings 1080 of the plurality of stacked disks 1070.

Figure 5:
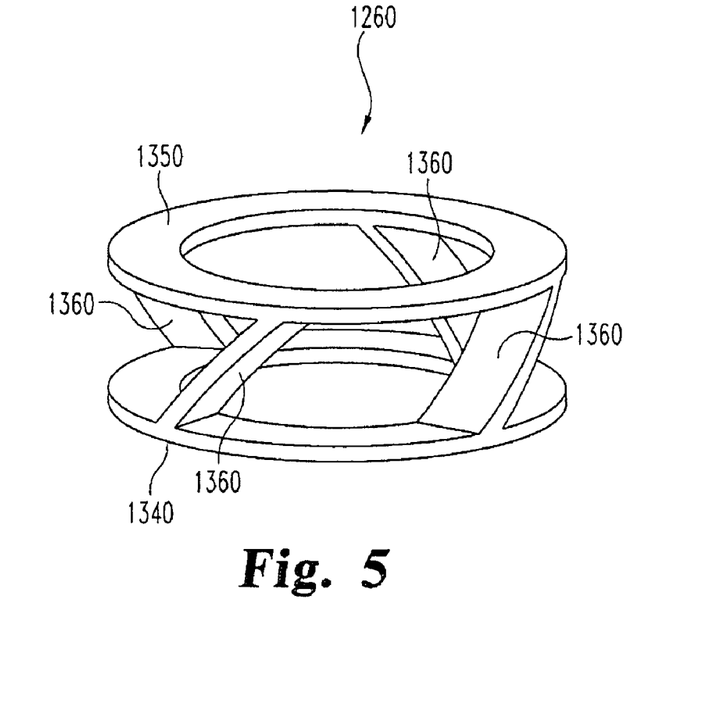
FIG. 5 is a perspective view of a component of a replaceable filter cartridge.

As shown in FIG. 5, compression member 1260 includes a bottom portion 1340 and a top portion 1350 each having a generally circular shape. Compression member 1260 further includes axial extending compression elements 1360 that flex to provide compression of top portion 1350 toward bottom portion 1340. Bottom portion 1340 interfaces with bottom endplate 1060 and top portion 1350 interfaces with lower surface 1320 such that compression member 1260 imparts a compression force on disk members 1070 toward the top endplate (not shown in FIGS. 4 and 5). The compression force maintains compression of stacked disks 1070 within the replaceable filter cartridge 1030. In one form of the present application, compression member 1260 is a composite spring formed from a thermoplastic. By forming compression member 1260 from composite, replaceable filter cartridge 1030 is incinerable without having to separate out any metal components.

Figure 6:
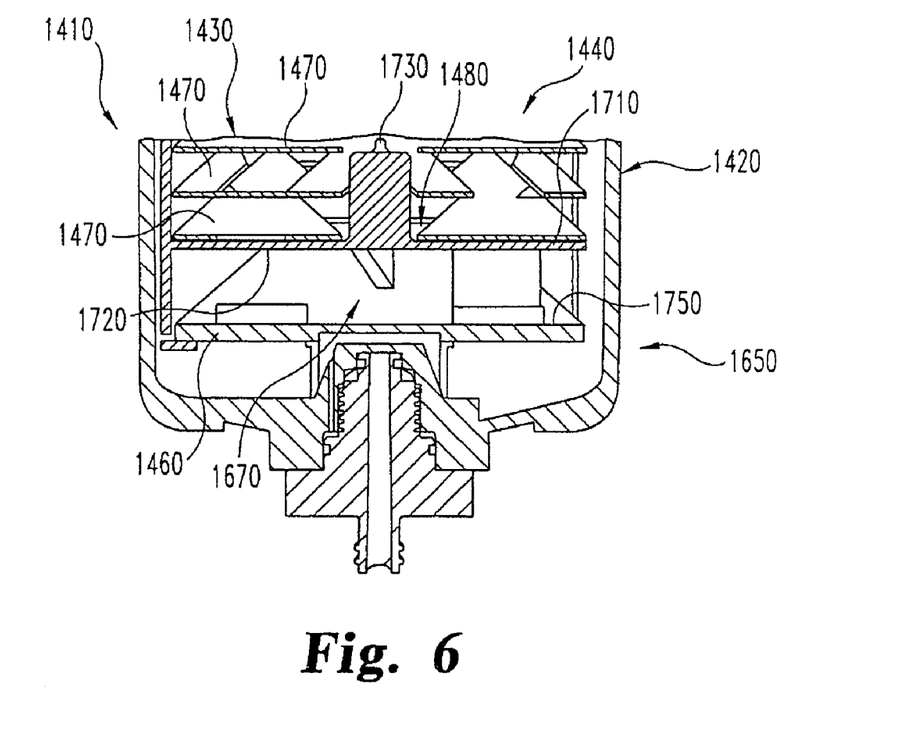
FIG. 6 is a sectional view of a portion of a filter assembly.

With reference to FIG. 6, there is illustrated a sectional view of a portion of a filter assembly 1410. Filter assembly includes a shell 1420 and a replaceable filter cartridge 1430. Replaceable filter cartridge 1430 is similar to replaceable filter cartridge 30 described above and includes filter media 1440 positioned between a top endplate (not shown) and a bottom endplate 1460. In the illustrated embodiment, filter media 1440 is a stack-disk bypass filter cartridge that includes a plurality of stacked disks 1470 of filter media each having a central opening 1480 and are positioned in a stacked relationship to each other.

Figure 7:
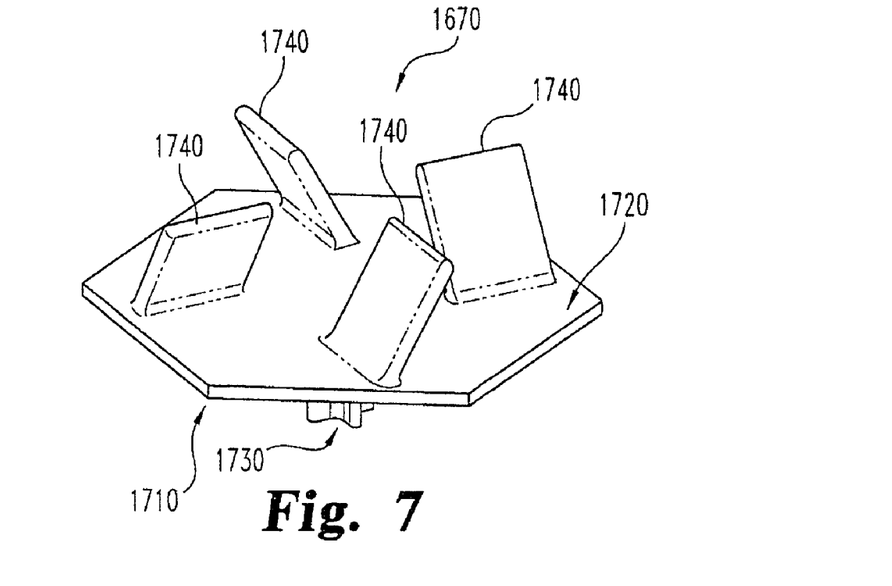
FIG. 7 is a perspective view of a component of a replaceable filter cartridge.

Replaceable filter cartridge 1430 includes a lower portion 1640 that includes bottom endplate 1460 and a compression assembly 1650. Compression assembly 1650 includes a compression endplate 1670 and a plurality of compression members 1740. As shown in FIGS. 6 and 7, compression endplate 1670 includes an upper surface 1710, a lower surface 1720, and a preferably star shaped boss portion 1730 extending upward from the upper surface 1710. Boss portion 1730 is sized to be positioned within center opening 1480 of at least one stacked disk 1470. The plurality of flanges 1740 are preferably integrally formed with and extend from bottom surface 1720. Compression members 1740 interface with bottom endplate 1460 and impart a compression force on stacked disks 1470. The compression force maintains compression of the plurality of stacked disks 1470 within the replaceable filter cartridge 1430. Compression endplate 1670 combines the functional features of compression endplate 270 and compression member 260 into a single component and may also allow bottom endplate 1460 to have a smooth upper surface 1750. Additionally, by forming compression endplate 1670 from thermoplastic, replaceable filter cartridge 1430 is incinerable without having to separate out any metal components from the rest of the replaceable filter cartridge 1430.

Figure 8:
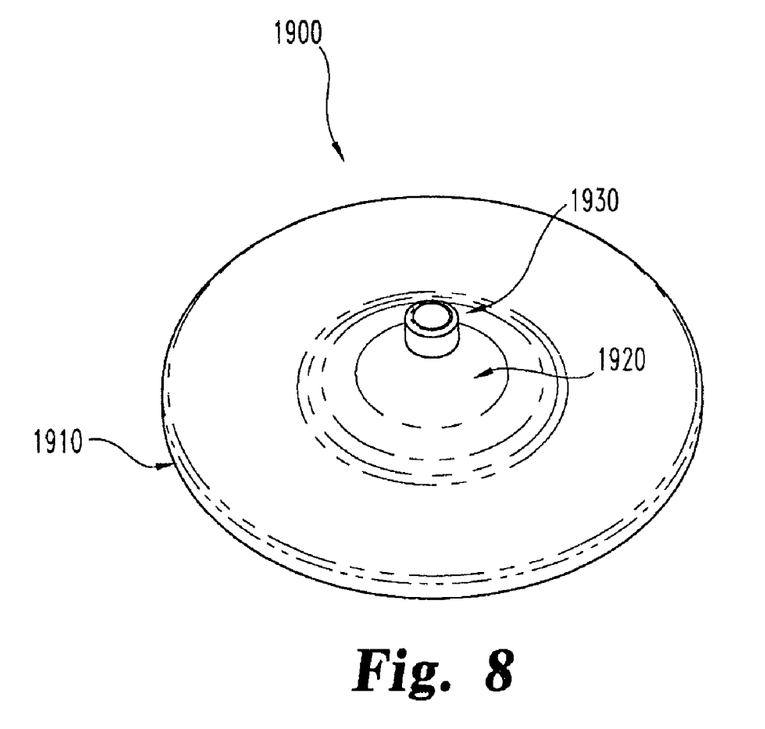
FIG. 8 is a perspective view of a component of a replaceable filter cartridge.

With reference to FIG. 8 there is illustrated a perspective view of a compression assembly 1900 in the form of a spring endcap. Compression assembly 1900 includes a body portion or compression endplate 1910, a compression member 1920, and a boss portion 1930. In one form of the present application, compression assembly 1900 is operable to replace compression endplate 270 and compression member 260 in replaceable filter cartridge 30 described above with reference to FIGS. 1 and 2.

Figure 9:
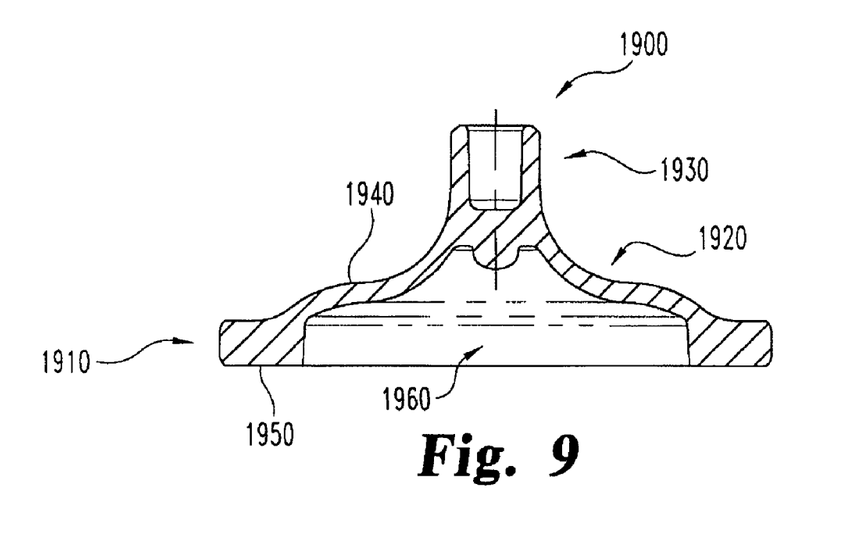
FIG. 9 is a cross-sectional view of the component of FIG. 8.

As shown in FIG. 9, body portion 1910 includes an upper surface 1940 and a lower surface 1950 having a recess or opening 1960. Upper surface 1940 is operable to support the plurality of stacked disks (not shown) of a replaceable filter cartridge (not shown). Boss portion 1930 is sized so that it is positioned within a center opening (not shown) of at least one disk. A bottom surface (not shown) of one of the stacked disks rests on upper surface 1940. Compression member 1920 is operable to flex and/or compress into and out of recess 1960 imparting a compression force on the plurality of stacked disks. In one form of the present application, compression assembly 1900 is formed from Acetal TX-90 resin. Other forms contemplate compression assembly 1900 being formed from other materials.

Figure 10:
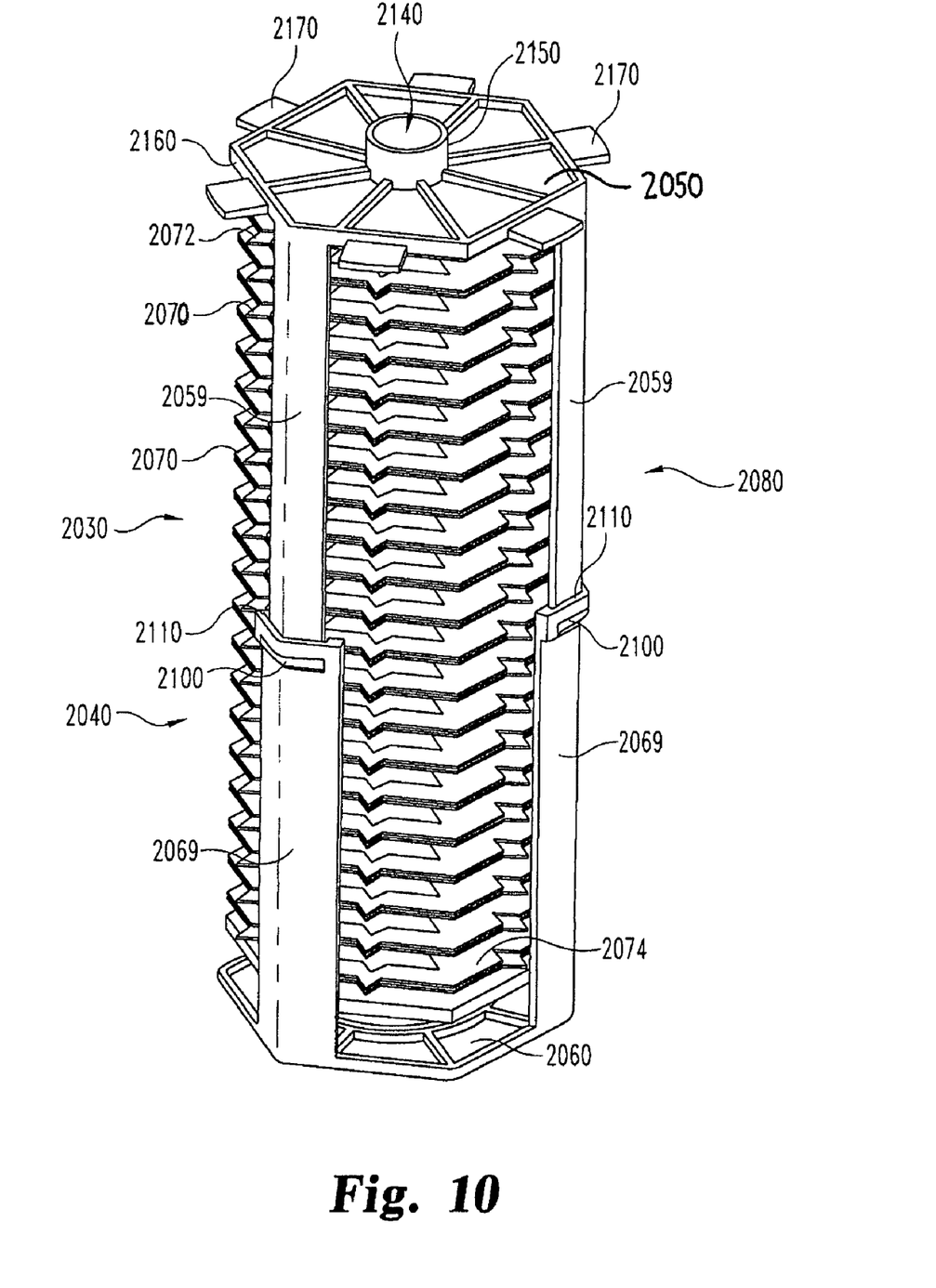
FIG. 10 is a perspective view of another embodiment of a replaceable filter cartridge.

With reference to FIG. 10 there is illustrated another embodiment of a replaceable filter cartridge 2030 of the present invention. Replaceable filter cartridge 2030 is a self-contained cartridge that includes filter media 2040 positioned between a top endplate 2050 and a bottom endplate 2060. Endplates 2050, 2060 are each preferably a unitary structure formed of a composite material such as thermoplastic or a thermoset. Other embodiments contemplate that top endplate 2050, bottom endplate 2060 or both endplates 2050, 2060 could be formed of multiple pieces coupled together. Filter media 2040 is preferably a stack-disk bypass filter medium that includes a plurality of stacked disks 2070 of filter media extending between a top end 2072 and a bottom end 2074. Each disk in the plurality of stacked disks 2070 includes an opening (not illustrated in FIG. 10). The opening of the top end 2072 of the plurality of stacked disks 2070 is preferably aligned with an orifice or opening 2140 defined by top endplate 2050. When the filter cartridge is assembled top end 2072 is preferably substantially adjacent to top endplate 2050.

As shown in FIG. 10, top endplate 2050 is connected to bottom endplate 2060 by a frame assembly 2080. Frame assembly 2080 includes a plurality (preferably a pair as illustrated in FIG. 10) of downwardly axially extending legs 2059. Frame assembly 2080 also includes a plurality (preferably a pair as illustrated in FIG. 10) of upwardly axially extending legs 2069. Legs 2059 are preferably integrally molded with top endplate 2050. Legs 2069 are preferably integrally molded with bottom endplate 2060. As illustrated, each leg 2059 includes a bottom engaging portion 2100, and each leg 2069 includes a top engaging portion 2110. The top engaging portion 2110 preferably includes a slot or recess to receive the bottom engaging portion 2100. The top engaging portion 2110 may be connected to the bottom engaging portion 2100 in a variety of ways including, but not limited to, snap fit, press or interference fit, adhesives or other locking mechanisms. Together each pair of legs 2059 and 2069 span the axial length of filter media 2040, and couple the top endplate 2050 to the bottom endplate 2060. In one form, legs 2059 and 2069 are rigid and are formed from a composite. Other embodiments contemplate legs 2059 and 2069 being formed from materials other than a composite, such as metal. Additionally, while only two pair of legs are shown in FIG. 10, different numbers of legs might be utilized. The embodiment of FIG. 10 might include any of the details relating to a bottom compression assembly as discussed herein with respect to other illustrated embodiments.

Top endplate 2050 includes opening 2140 preferably fluidly connected to a central column flow path for filtered fluid defined by a centrally positioned opening (not shown in FIG. 10) in each of the plurality of stacked disks 2070 of filter media. As shown in FIG. 10, a sealing flange 2150 is positioned adjacent opening 2140 and extends from top endplate 2050 in a generally axial direction. Top endplate 2050 extends from opening 2140 to an outer periphery 2160. Top endplate 2050 preferably includes a plurality of projections 2170 extending from periphery 2160. Projections 2170 extend in a radial direction away from opening 2140. In one form of the present invention, a gasket (not shown in FIG. 10) is provided to surround sealing flange 2150 to provide additional sealing when filter assembly is mounted to the filter head.

Figure 11:
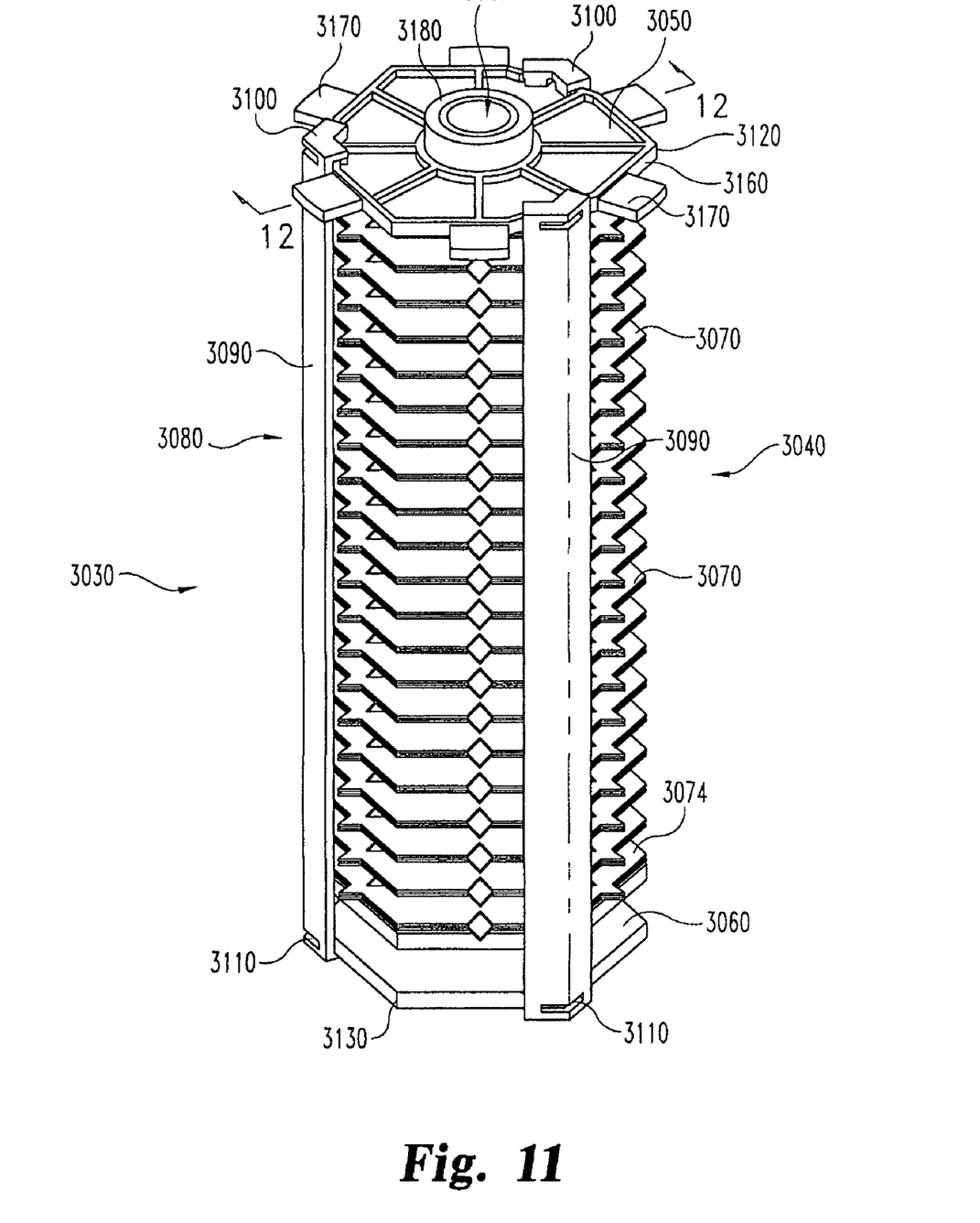
FIG. 11 is a perspective view of another embodiment of a replaceable filter cartridge.
Figure 12:
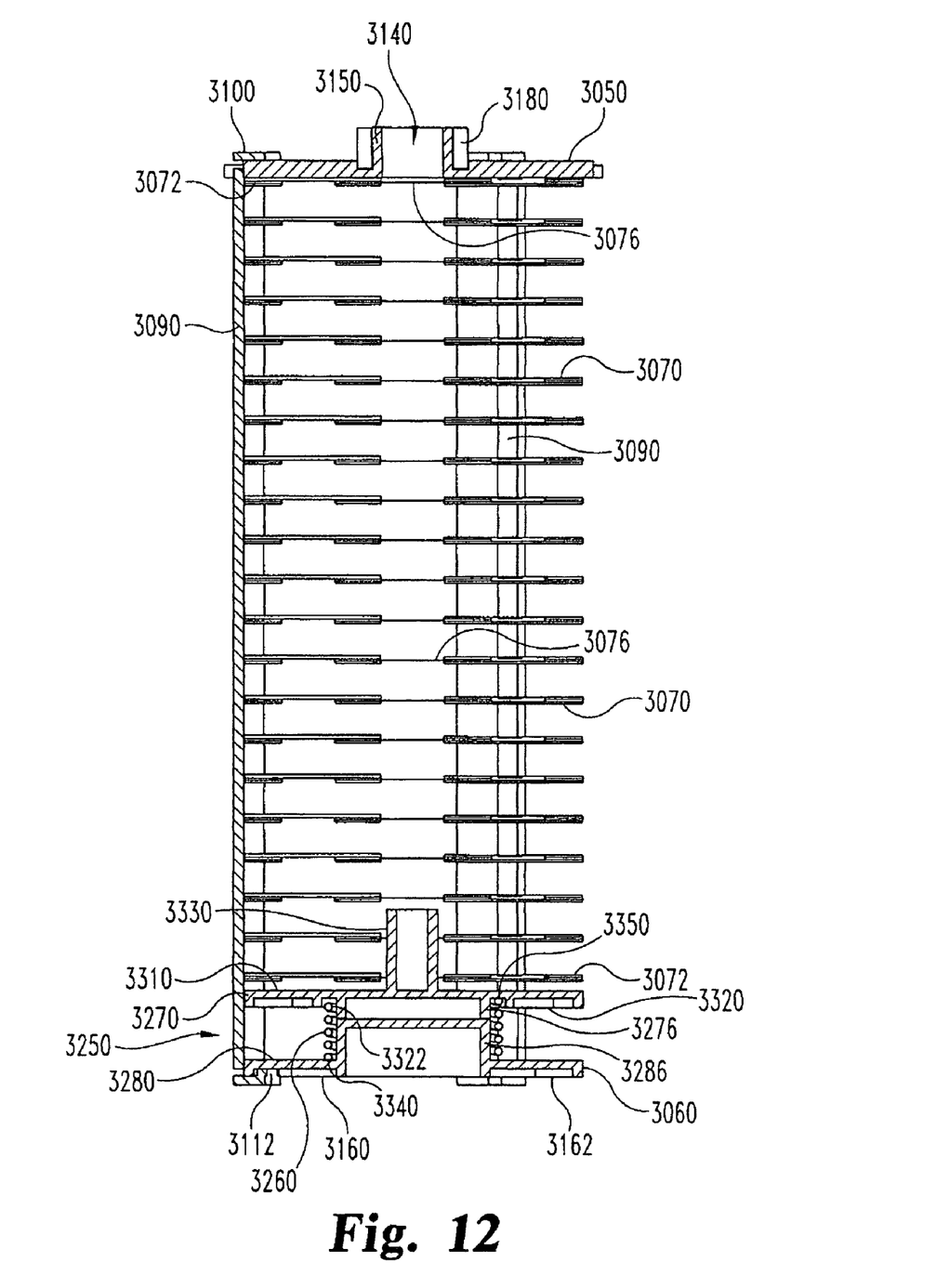
FIG. 12 is a cross-sectional view of FIG. 11.

With reference to FIGS. 11 and 12 there is illustrated another embodiment of a replaceable filter cartridge 3030 of the present invention. Replaceable filter cartridge 3030 is a self-contained cartridge that includes filter media 3040 positioned between a top endplate 3050 and a bottom endplate 3060. Endplates 3050, 3060 are each preferably a unitary structure formed of a composite material such as thermoplastic or a thermoset. Other embodiments contemplate that top endplate 3050, bottom endplate 3060 or both endplates 3050, 3060 could be formed of multiple pieces coupled together. Filter media 3040 is preferably a stack-disk bypass filter medium that includes a plurality of stacked disks 3070 of filter media extending between a top end 3072 and a bottom end 3074. Each disk in the plurality of stacked disks 3070 includes an opening 3076. The opening 3076 of the top end 3072 of the plurality of stacked disks 3070 is preferably aligned with an orifice or opening 3140 defined by top endplate 3050. When the filter cartridge is assembled top end 3072 is preferably substantially adjacent to top endplate 3050.

As shown in FIGS. 11 and 12, top endplate 3050 is connected to bottom endplate 3060 by a frame assembly 3080. Frame assembly 3080 includes a plurality of axially extending frame members 3090 that extend along the axial length of filter media 3040. In one form, frame members 3090 are rigid and are formed from a composite. Other embodiments contemplate frame members 3090 being formed from materials other than a composite, such as metal. Each frame member 3090 includes a top engaging portion 3100 and a bottom engaging portion 3110. Each top engaging portion 3100 preferably couples to a corner portion 3120 of top endplate 3050. Each bottom engaging portion 3110 preferably couples to a corner portion 3130 of bottom endplate 3060. The top engaging portion 3100 and the bottom engaging portion 3100 may be connected to the respective endplates in a variety of ways including, but not limited to, snap fit, press or interference fit, adhesives or other locking mechanisms. For example, the bottom engaging portion 3110 might include a locking tab 3112 that engages a recess 3162 in bottom end 3160 of bottom endplate 3060. The plurality of frame members 3090 are preferably equally spaced around the perimeter of each endplate 3050, 3060. While only three frame members 3090 are shown in the figures, different numbers of frame members 3090 might be utilized. In particular, in one embodiment contemplated as within the scope of the invention only two frame members join the endplates.

Top endplate 3050 includes opening 3140 preferably fluidly connected to a central column flow path for filtered fluid defined by centrally positioned opening 3076 in the plurality of stacked disks 3070 of filter media. As shown in FIG. 12, a sealing flange 3150 is positioned adjacent opening 3140 and extends from top endplate 3050 in a generally axial direction. Top endplate 3050 extends from opening 3140 to an outer periphery 3160. Top endplate 3050 preferably includes a plurality of projections 3170 extending from periphery 3160. Projections 3170 extend in a radial direction away from opening 3140. In one form of the present invention, a gasket 3180 is provided to surround sealing flange 3150 to provide additional sealing when filter assembly is mounted to the filter head.

As illustrated in FIG. 12, replaceable filter cartridge 3030 includes one embodiment of a compression assembly 3250 supported by bottom endplate 3060. In one embodiment, compression assembly 3250 includes at least one compression member 3260, and a compression endplate 3270. Bottom endplate 3060 includes a top surface 3280 that might include a receiving channel such as a groove operable to receive compression member 3260. However, as illustrated in FIG. 12, top surface 3280 preferably defines a substantially cylindrical flange 3286 with an outer diameter approximately equal to the inner diameter of the compression member 3260. Substantially cylindrical flange 3286 on top surface 3280 of the bottom endplate 3060 and another substantially cylindrical flange 3276 on lower surface 3320 cooperate to form a support portion sized to retain compression member 3260.

Compression endplate 3270 includes an upper surface 3310, a lower surface 3320, and a preferably star shaped boss portion 3330 extending upward from the upper surface 3310. Boss portion 3330 is sized to be positioned within center opening 3076 at the bottom end 3074 of at least one stacked disk 3070. Boss portion 3330 minimizes or prevents unfiltered fluid from flowing through the internal columnar fluid flow path of filter media 3040. Compression member 3260 includes a bottom end 3340 and a top end 3350. Bottom end 3340 interfaces with bottom endplate 3060 and top end 3350 interfaces with lower surface 3320 (preferably with a groove 3322 formed therein) such that compression member 3260 imparts a compression force on the plurality of stacked disks of filter media 3070. The compression force maintains compression on the plurality of stacked disks of filter media 3070. The compression force biases the plurality of stacked disks 3070 toward top endplate 3050. Preferably, compression member 3260 is formed from a composite material such as a thermoplastic or a thermoset and all components of replaceable cartridge filter 3030 are incinerable. In other forms of the present application, compression member 3260 is a metal coil spring and not incinerable.

As should be appreciated from the above description, while the plurality of frame members are disclosed in some embodiments as preferably including two (2) frame members, and in other embodiments as preferably including three (3) frame members equally spaced around the outer perimeter of the plurality of stacked disks of filter media, other spacing, location, and quantities of frame members are contemplated. As another example, the plurality of frame members could be spaced (equally or unequally) within the central column defined by the openings of the plurality of stacked disks of filter media or the plurality of frame members could be replaced within the central column with a single cylinder connected to the top and bottom endplate, the cylinder having openings and/or perforations to permit fluid to pass through the filter media into the central column.

Various embodiments previously discussed above refer to the frame members being connected to the various endplates/endcaps. It should be understood that it is contemplated as within the scope of the invention that the frame members may be connected via a variety of mechanisms known to those of skill in the art. Such mechanisms include, but are not limited to, snap fit, coupling and adhesives. It should also be understood that the frame members might be legs molded as part of the endcaps. Thus, it is contemplated as within the scope of the invention that the frame members might be legs that are integrally formed with at least one of the endplates. Similarly, also contemplated as within the scope of the invention are embodiments wherein legs molded with the top endcap extend downward and are connected at an intermediate position (between the top endcap and the bottom endcap) to corresponding upwardly extending legs molded as part of the bottom endcap.

It should be understood that the bypass filter medium preferably comprises a stack of paper or cardboard disks each having a central aperture (able to be of circular, oval, oblong, hexagonal, octagonal or other shape). The term "disk stack," "stack of disks," or "stacked disk" as used in the present patent application is aimed at covering any laminate structure constituted by superposition of several layers of filter medium in paper, cardboard or any other equivalent material, for example synthetic or inorganic fibers, able to take any geometric shape. The disks constituting the stack in question preferably include one or several holes. The holes in the disks may be either aligned or staggered, but in either case the holes preferably assume a columnar form, providing an interior filtered lubricant channel. The column is preferably centrally located, thus showing a central aperture at either end. However, it should be understood that locations other than central are contemplated as within the scope of the invention, and thus the longitudinal member described for various embodiments of the present invention may also be other then centrally located.

One preferred application of the various embodiments disclosed herein is as a bypass oil filter. However, it should be understood that other applications are contemplated as within the scope of the invention.

While exemplary embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A replaceable filter cartridge for use with an outer shell comprising:
   a plurality of stacked disks of filter media extending between a first endplate and a second endplate;
   a plurality of frame members extending axially between and connected to the first endplate and the second endplate;
   a compression assembly between the first endplate and the plurality of stacked disks, the compression assembly including at least one compression member and a compression endplate acted on by the compression member and engaged with the plurality of stacked disks of filter media, the compression endplate is movable relative to the plurality of frame members in a direction toward the second endplate, and the compression member being positioned and configured to impart a compression force on said plurality of stacked disks of filter media via the compression endplate thereby biasing said plurality of stacked disks of filter media in an axial direction toward the second endplate; and
   the first endplate and the compression endplate are devoid of a fluid passageway.

2. The replaceable filter cartridge of claim 1, wherein said plurality of frame members includes at least two frame members.

3. The replaceable filter cartridge of claim 2, wherein said plurality of frame members includes three frame members that are equally spaced around the perimeter of said plurality of stacked disks of filter media.

4. The replaceable filter cartridge of claim 1, wherein the first endplate includes a receiving channel that is open toward the plurality of stacked disks to receive said at least one compression member.

5. The replaceable filter cartridge of claim 4, wherein said at least one compression member is a composite spring, and wherein the replaceable filter cartridge is incinerable.

6. The replaceable filter cartridge of claim 1, wherein the frame members comprise a first pair of legs integrally formed with the first endplate and a second pair of legs integrally formed with the second endplate, the first pair of the legs being connected to the second pair of legs at a position between the first endplate and the second endplate.

7. The replaceable filter cartridge of claim 1, wherein at least one of the first endplate and the compression endplate includes a substantially cylindrical flange extending toward the other of the first endplate and the compression endplate, and wherein the compression member is a spring around the cylindrical flange.

8. The replaceable filter cartridge of claim 1, wherein the at least one compression member is a plurality of compression flanges, and wherein said plurality of compression flanges extend toward and contact the first endplate biasing said plurality of stacked disks in the axial direction toward the second endplate.

9. The replaceable filter cartridge of claim 1, wherein the compression endplate is integrally formed with said at least one compression member.

10. A replaceable filter cartridge for use with an outer shell comprising:
 a plurality of stacked disks of filter media extending between a first end and a second end;
 a first endplate positioned adjacent the first end;
 a second endplate positioned adjacent the second end;
 a plurality of frame members connected to the first endplate and the second endplate, said plurality of frame members and the first and second endplates cooperating to retain said plurality of stacked disks of filter media;
 a compression assembly between the first endplate and the plurality of stacked disks, the compression assembly including at least one compression member operable to impart a compression force on said plurality of stacked disks of filter media thereby biasing said plurality of stacked disks of filter media in an axial direction toward the second endplate without biasing the first end plate in an axial direction toward the second endplate; and
 the second endplate includes a plurality of outwardly-extending radial projections that are configured to set a desired insertion depth of the replaceable filter cartridge into the outer shell and prevent rotation of the replaceable filter cartridge relative to the outer shell when installed; and
 the first endplate and the compression endplate are devoid of a fluid passageway.

11. The replaceable filter cartridge of claim 10, wherein the replaceable filter cartridge is incinerable, and wherein the frame members are molded as part of at least one of the first endplate and the second endplate.

12. The replaceable filter cartridge of claim 10, wherein the compression assembly includes a compression endplate engaging said plurality of stacked disks of filter media, the compression endplate being spaced apart from the first endplate by said at least one compression member, and wherein the compression endplate is operable to transfer the compression force from said at least one compression member directly onto the first end of said plurality of stacked disks of filter media.

13. The replaceable filter cartridge of claim 12, wherein at least one of the first endplate and the compression endplate includes a substantially cylindrical flange extending toward the other of the first endplate and the compression endplate, and wherein the compression member is a spring around the cylindrical flange.

14. The replaceable filter cartridge of claim 12, wherein the at least one-compression member is a plurality of compression flanges attached to the compression endplate, the plurality of compression flanges extending toward the first endplate.

15. The replaceable filter cartridge of claim 10, wherein the first endplate includes a receiving channel that is open toward the first end of the plurality of stacked disks to receive said at least one compression member.

16. The replaceable filter cartridge of claim 10, wherein said means for axially biasing includes an integrally formed spring endcap having an upper surface and a lower surface having a recess, and wherein the upper surface is operable to support said plurality of stacked disks of filter media.

17. The replaceable filter cartridge of claim 16, wherein the upper surface is operable to flex into and out of the recess thereby axially biasing said plurality of stacked disks of filter media toward the second endplate.

18. An incinerable filter cartridge comprising:
 a plurality of stacked disks of filter media extending between a first end and a second end;
 a first endcap positioned adjacent the first end;
 a second endcap positioned adjacent the second end, the second endcap being integrally formed with at least one compression member, the second endcap including a first surface operable to support the plurality of stacked disks of filter media and a second surface having a recess;
 a plurality of frame members connected to the first endcap and the second endcap,
 the second endcap includes a boss portion extending from the first surface in an axial direction toward the plurality of stacked disks of filter media and positioned within a center opening of at least one of the plurality of stacked disks,
 wherein the second endcap is a spring endcap operable to flex and/or compress into and out of the recess to impart a compression force on said plurality of stacked disks of filter media thereby biasing said plurality of stacked disks of filter media in an axial direction toward the first end.

19. The incinerable filter cartridge of claim 18, wherein said plurality of frame members includes at least three frame members equally spaced around the perimeter of said plurality of stacked disks of filter media.

20. The incinerable filter cartridge of claim 18, wherein the frame members comprise a first pair of legs integrally formed with the first endcap and a second pair of legs integrally formed with the second endcap, the first pair of the legs being connected to the second pair of legs at a position between the first endcap and the second endcap.

21. The replaceable filter cartridge of claim 1, wherein the compression endplate includes a boss portion extending in an axial direction toward the plurality of stacked disks of filter media and positioned within a center opening of at least one of the plurality of stacked disks.

22. The replaceable filter cartridge of claim 1, wherein the second endplate includes a sealing flange extending in a direction away from the first endplate.

* * * * *

UNITED STATES PATENT AND TRADEMARK OFFICE
CERTIFICATE OF CORRECTION

PATENT NO. : 8,220,640 B2  Page 1 of 1
APPLICATION NO. : 11/880603
DATED : July 17, 2012
INVENTOR(S) : Schmitz et al.

It is certified that error appears in the above-identified patent and that said Letters Patent is hereby corrected as shown below:

On the Title Page:
Item (75) Inventors: "Kelly H. Schmitz" should read --Kelly R. Schmitz--

Signed and Sealed this
Thirteenth Day of November, 2012

David J. Kappos
*Director of the United States Patent and Trademark Office*